S. F. Emerson,
Wringer Roll,
No. 55,077. Patented May 29, 1866.
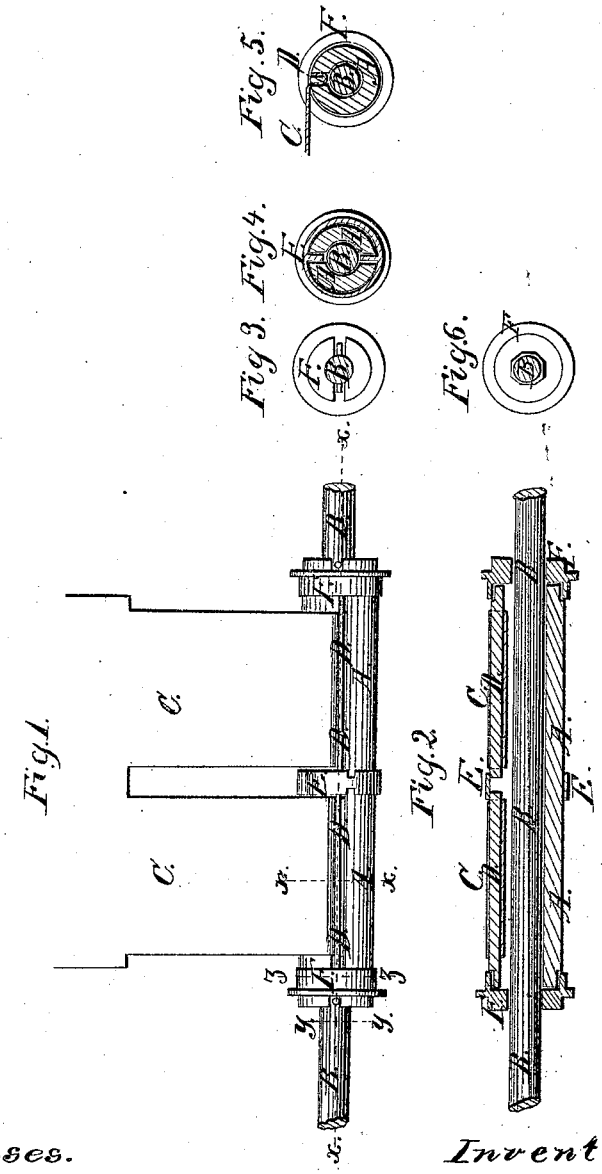

UNITED STATES PATENT OFFICE.

S. F. EMERSON, OF SEVILLE, OHIO.

IMPROVED ROLLER FOR WRINGER-MACHINES.

Specification forming part of Letters Patent No. 55,077, dated May 29, 1866.

*To all whom it may concern:*

Be it known that I, S. F. EMERSON, of Seville, in the county of Medina and State of Ohio, have invented a new and useful Improvement in Rubber Rolls for Washing and Wringing Machines; and I do hereby declare that the following is a full, clear, and exact description thereof, which will enable others skilled in the art to make and use the same, reference being had to the accompanying drawings, forming part of this specification, in which—

Figure 1 is a side view of my improved roll. Fig. 2 is a longitudinal section of the same, taken through the line $x\,x$, Fig. 1. Fig. 3 is a cross-section of the same, taken through the line $y\,y$, Fig. 1. Fig. 4 is a cross-section of the same, taken through the line $z\,z$, Fig. 1. Fig. 5 is a cross-section of the same, taken through the line $x'\,x'$, Fig. 1. Fig. 6 is the same view as Fig. 3, showing another mode of attaching the washers to the shaft.

Similar letters of reference indicate like parts.

My invention has for its object to furnish an improved roll for washing and wringing machines, so constructed that the rubber cannot come in contact with the iron shaft to cause it to rust, and thereby destroy the usefulness of the roll, that the roll may not get loose upon the shaft, and that a new roll may be applied to the shaft without having to send the shaft to the manufacturer to have a new roll made upon it; and it consists, first, in a hollow slotted cylinder, of wood or other suitable material, constructed as hereinafter described, in combination with the rubber roll and with the wedges by which the said rubber roll is attached to the said cylinder; second, in the combination of a central band with the cylinder, wedges, and rubber roll; and, third, in the combination of the washers or ferrules, constructed as hereinafter described, with the cylinder, for the purpose of attaching the said cylinder immovably to the shaft.

A is a hollow cylinder, made of wood or other suitable material, the bore of which is of such a size as to fit upon the shaft B. This cylinder A is slotted longitudinally, as shown in Figs. 1 and 5, for the reception of the end of the sheet of rubber C, of which the roll is to be made. The end of the sheet C of the rubber is laid evenly over the slot in the cylinder, and the wedges D are then forced into their places in the slot, as shown in Figs. 1, 2, and 5, firmly securing the end of the sheet C to the cylinder A. The central part of the cylinder is kept from spreading, and the ends of the wedges D kept in place by a band E passing around the cylinder, as shown in Figs 1 and 2. The edges of the band E are notched, as shown, to enable the wedges D to be inserted. Then, by turning the band a little to one side the end of the said wedges will be held securely in place.

A strip should be cut out of the central part of the end of the rubber sheet C to compensate for the thickness of the band E and keep the surface of the roll level.

The cylinder A is kept from spreading out at the ends and is secured to the shaft A by the washers or ferrules F, which are made with lugs or projections on their inner sides, as shown in Fig. 4, which fit into notches formed in the ends of the cylinder A and prevent it from turning upon the shaft B, except as the said ferrules F turn.

The washers or ferrules F are secured in place upon the shaft B by pins G passing through slots formed in the outer surface of the washers F and through holes in the shaft B, as shown in Figs. 1 and 3; or the journals of the shaft B may be turned down or made smaller than the part of the shaft that passes through the cylinder B, and the shoulders thus formed changed from a circle to a polygon, upon which the washers may be slipped, as shown in Fig. 6; but I prefer the manner of attachment first described.

By this construction the rubber rolls are made upon the cylinder A, and thus can be attached to or removed from the shaft B at pleasure.

What I claim as new, and desire to secure by Letters Patent, is—

1. The hollow slotted cylinder A, constructed as herein described, in combination with the wedges D and with the rubber C, substantially as and for the purpose set forth.

2. The combination of the central band, E, with the cylinder A, wedges D, and rubber C, substantially as described, and for the purpose set forth.

3. The combination of the washers or ferrules F, constructed as described, with the cylinder A, substantially as and for the purpose set forth.

S. F. EMERSON.

Witnesses:
JOSEPH ROSS,
LOUIS LEON.